United States Patent [19]

Miller et al.

[11] Patent Number: 5,899,979
[45] Date of Patent: May 4, 1999

[54] METHOD AND SYSTEM FOR AUTOMATICALLY INTEGRATING SCHEDULED WORK ITEMS ONTO AN ELECTRONIC CALENDAR

[75] Inventors: David Robert Miller, Keller, Tex.; David John Schell, Raleigh, N.C.

[73] Assignee: International Business Machines Corporation, Armonk, N.Y.

[21] Appl. No.: 08/681,340

[22] Filed: Jul. 22, 1996

[51] Int. Cl.[6] .................................................. G06F 17/60
[52] U.S. Cl. .......................... 705/9; 705/1; 705/7; 705/8; 705/9; 345/186
[58] Field of Search ................................. 705/1, 9, 14, 7, 705/8; 395/186; 345/329, 326

[56] References Cited

U.S. PATENT DOCUMENTS

| | | |
|---|---|---|
| 4,807,154 | 2/1989 | Scully et al. .............................. 345/329 |
| 4,807,155 | 2/1989 | Cree et al. ................................ 345/129 |
| 5,464,175 | 11/1995 | Short ....................................... 244/12.5 |
| 5,491,626 | 2/1996 | Williams et al. ............................ 705/9 |
| 5,500,938 | 3/1996 | Cahill et al. ............................. 345/326 |
| 5,519,606 | 5/1996 | Frid-Nielsen et al. ....................... 705/9 |
| 5,528,745 | 6/1996 | King et al. .............................. 345/326 |
| 5,564,016 | 10/1996 | Korenshtein ............................. 395/186 |
| 5,778,346 | 7/1998 | Frid-Nielsen et al. ....................... 705/9 |

*Primary Examiner*—Allen R. MacDonald
*Assistant Examiner*—Romain Jeanty
*Attorney, Agent, or Firm*—A. Bruce Clay

[57] ABSTRACT

An electronic scheduling calendar is made more useful to a user by merging to-do list items onto an event list schedule. A user can assign priorities to the to-do list items and estimates of how much time is required to complete each item. Then, upon request by the user, the to-do list items will be placed onto the event list in an available time slot on an available day.

15 Claims, 6 Drawing Sheets

METHOD AND SYSTEM FOR AUTOMATICALLY INTEGRATING SCHEDULED WORK ITEMS ONTO AN ELECTRONIC CALENDAR

FIELD OF THE INVENTION

This invention relates in general to computer software, and in particular to a method and system for automatically integrating to-do list items into a scheduling calendar.

BACKGROUND OF THE INVENTION

Electronic calendar usage has greatly proliferated as the use of personal computers has gained popularity. Electronic calendar systems allow a user to maintain a personal or group schedule on a day-to-day basis. Other calendar functions often include the ability to schedule meetings, check other calendars, prepare a personal memorandum applicable to a single date, and maintain a current "To-do List".

A user is generally provided with a time breakdown of each individual day in order to schedule and see events for that day. By utilizing pop up menus, drop down boxes, etc., the user may enter dates, times, attendees, and event descriptions for placement into the time breakdowns.

Many current calendars also provide a "To-do List" as separate items typically carried on a separate portion of the calendar or in a separate file. Whenever a user selects an entry for a to-do list item, the appropriate information may be inserted and then appears only in the to-do list. There is no known solution which integrates to-do list items with the scheduling calendar. The term integrate or integration, as used herein, is meant to describe the merging of separate items from separate lists into one list rather than merely being packaged together or displayed in the same on-screen panel. Thus, it is desirable to provide a method and system which will allow integration of to-do items with a scheduling calendar.

SUMMARY OF THE INVENTION

The present invention disclosed herein comprises a method and system for integrating to-do items into an event list which eliminates the problem associated with prior electronic calendaring programs. The present invention allows the merging of two separate lists of items into a single schedule for more efficient time management.

In accordance with one aspect of the invention, to-do items are integrated into an event list on an electronic calendaring program. A user defined priority is assigned to a to-do list item. The priority may be an alphabetic priority indicator such as A, B, etc. An amount of time required to complete the to-do list item is either estimated and assigned by the user or a default amount of time is automatically assigned. The to-do list item is then automatically scheduled onto the event list on an available date and time.

It is a technical advantage of the present invention that an electronic calendaring program user can more efficiently manage his/her time by scheduling to-do items for completion.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
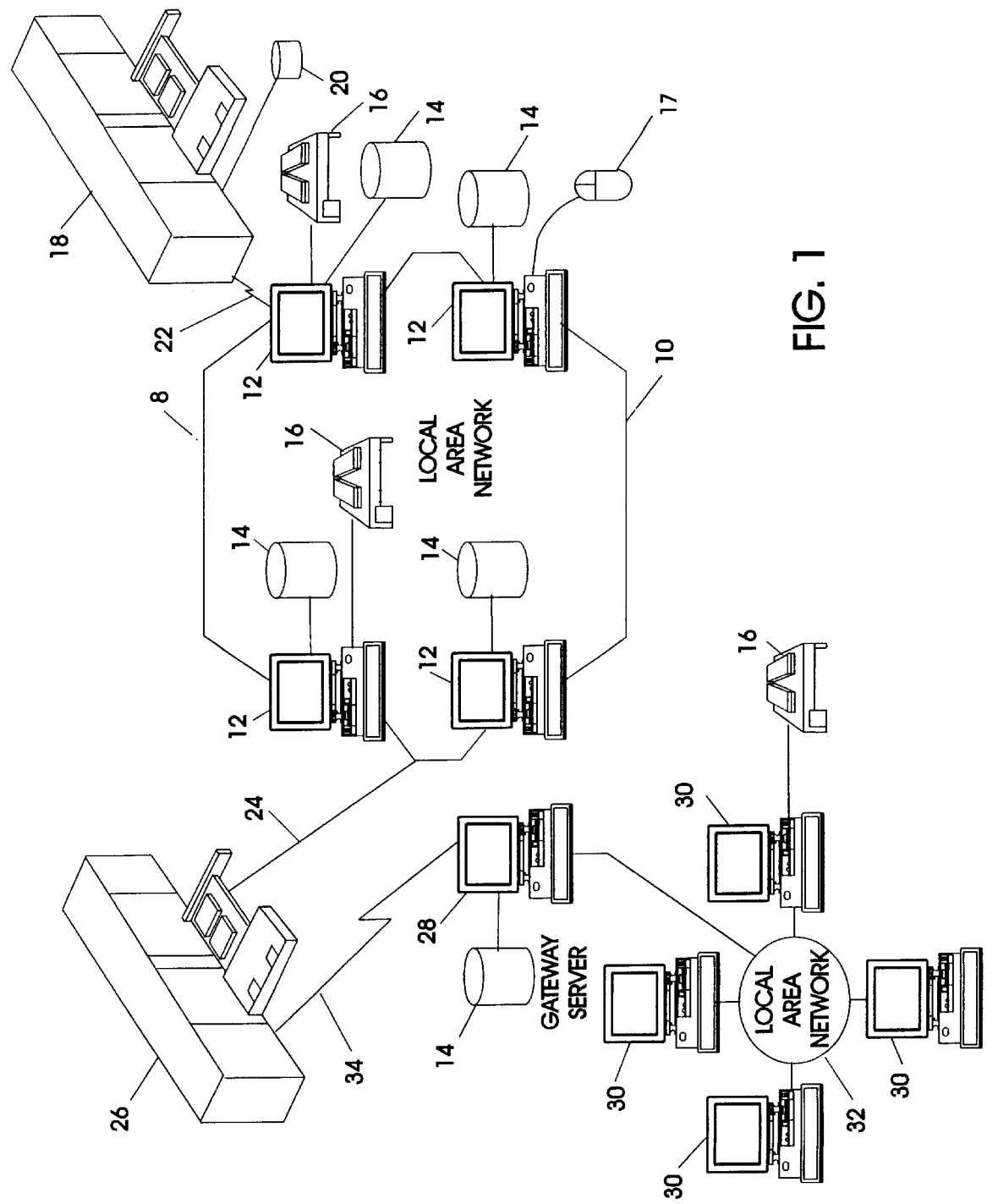
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS)coupled to a host processor may be utilized for each such network. As is common in such data processing systems, each individual computer may be coupled to a storage device 14 and/or a printer/output device 16 and be provided with a pointing device such as mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone work station from which a developer may access the code. For distribution purposes, the software program code may be embodied on any of a variety of known media for use with a data processing system, such as a diskette or CD-ROM or may be distributed to users from the memory of one computer system over a network of some type to other computer systems for use by users of such other systems. Such techniques and methods for embodying software code on media and/or distributing software code are well known and will not be further discussed herein.

Figure 2:
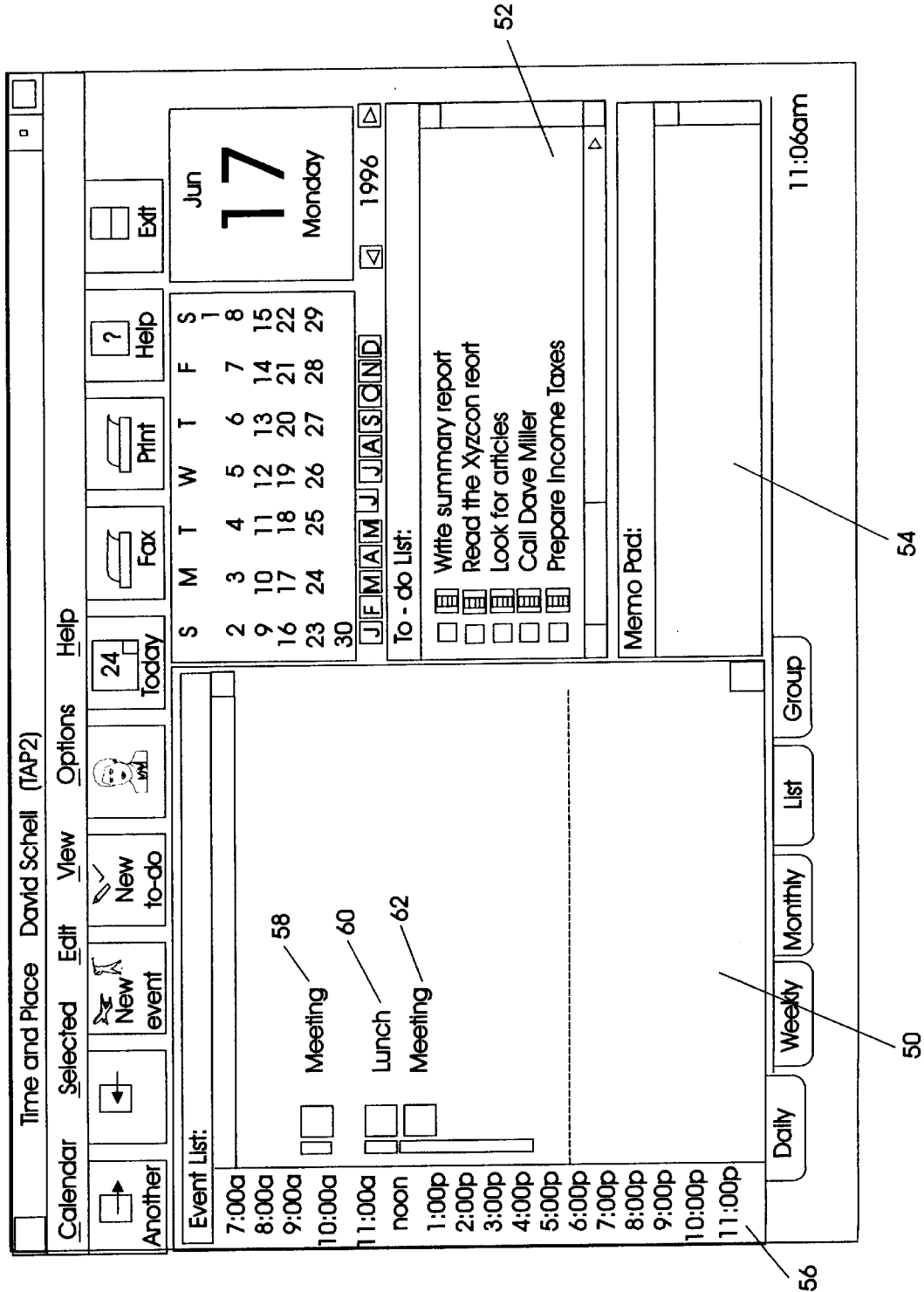
FIGS. 2 and 3 are prior art examples of typical scheduling calendars.
Figure 3:
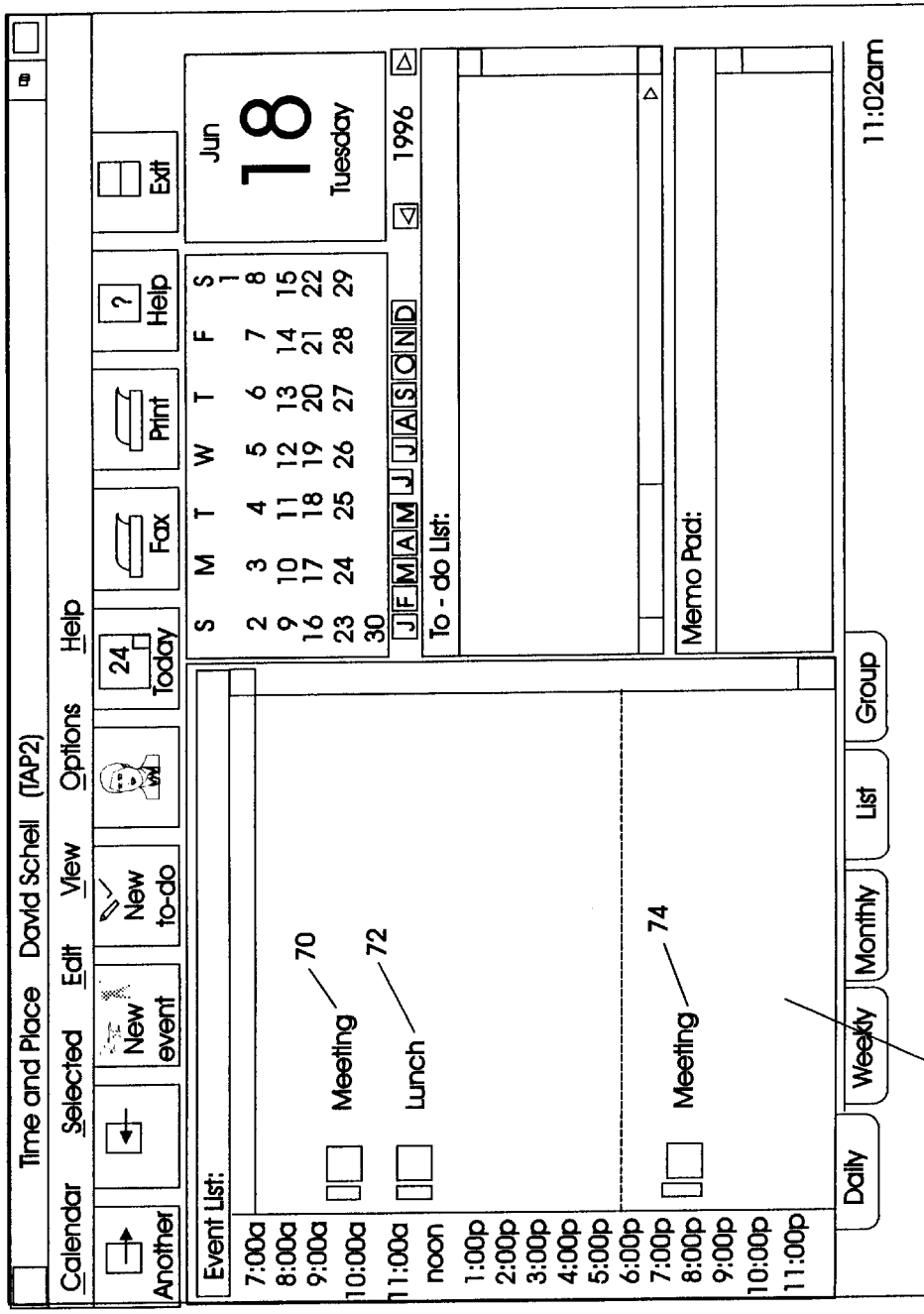

Referring next to FIGS. 2 and 3, graphical displays are shown of prior art calendars. In FIG. 2 for the date Jun. 17, 1996, there is an event list 50, a to-do list 52 and a memo pad 54. The event list 50 is broken down into one hour time blocks as illustrated by time line 56. The owner of this calendar has scheduled a meeting, identified by reference numeral 58, from 9:00 a.m. to 10:00 a.m.; lunch, identified by reference numeral 60, from 11:00 a.m. until noon; and a meeting, identified by reference numeral 62, from noon until 4:00 p.m.

In the to-do list 52, there is a plurality of items requiring action by the owner of the calendar. There is no integration between the to-do list items and the event list. Therefore, the power of the scheduling calendar is not fully utilized as to-do list items are merely allowed to accumulate without being scheduled for completion.

FIG. 3 shows a scheduling calendar for the next day subsequent to the prior art calendar shown in FIG. 2. In FIG. 3, there are only three events on the event list 50 comprising a meeting, identified by reference numeral 70; lunch, identified by reference numeral 72; and a meeting, identified by reference numeral 74. As can be seen by referring to FIGS. 2 and 3, it would be advantageous to the user of this calendar system if the to-do list items were integrated into the event list so that they could be done on a scheduled basis.

Figure 4:
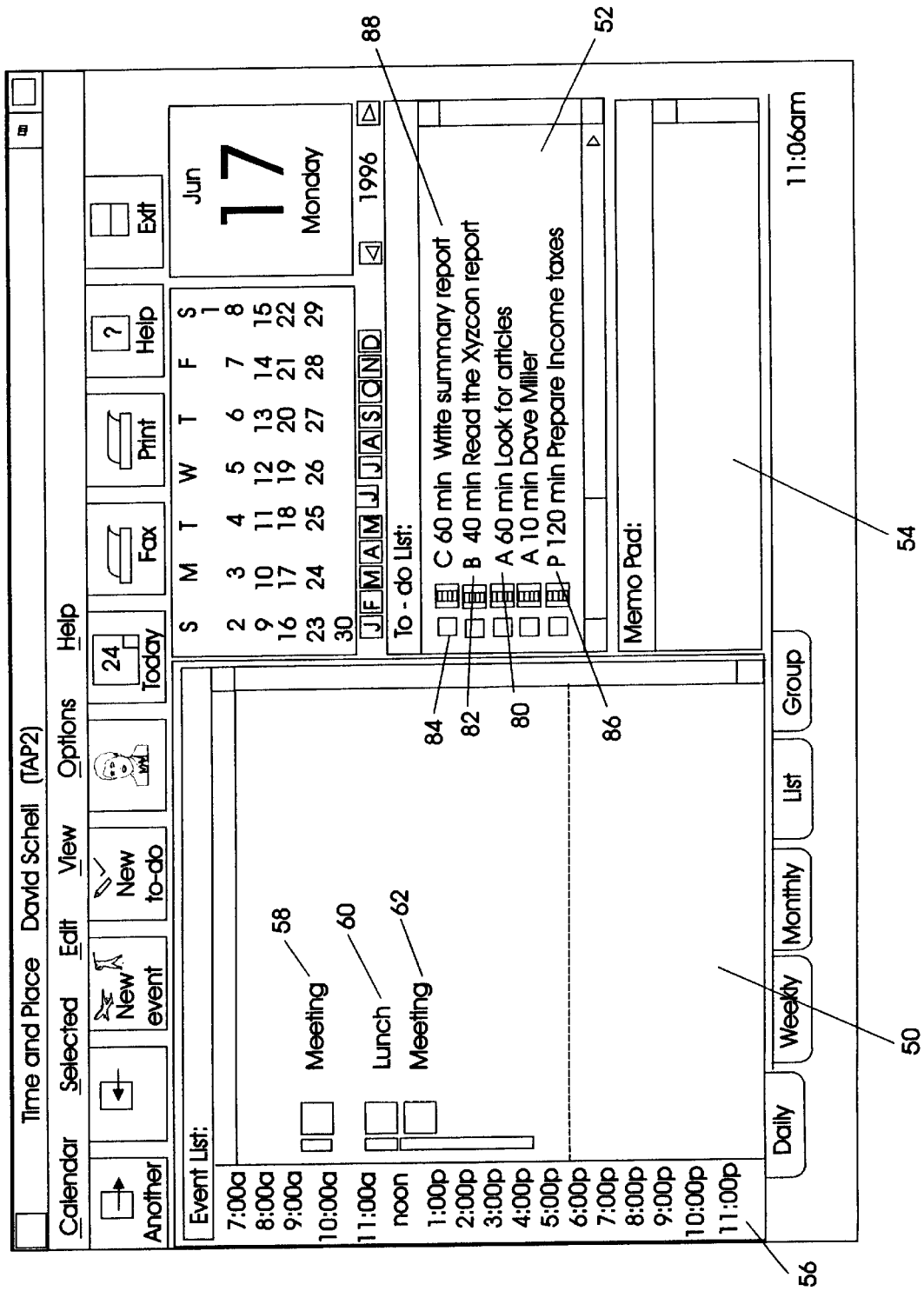
FIG. 4 is a graphical display of the use of the present invention to convert the prior art calendar of FIG. 2.

Referring to FIG. 4, a scheduling calendar is illustrated in accordance with the present invention. Similar to what is shown in FIG. 2, there are three scheduled events on the event list 50 which includes the meeting 58, lunch 60 and the meeting 62. However, the user of the calendar has inserted additional information for each item on the to-do list.

In accordance with the present invention, a priority is assigned to each item on the to-do list. As shown in FIG. 4, the priorities are shown as letters, for example, "A" identified by reference numeral 80, "B" identified by reference numeral 82, "C" identified by reference numeral 84, and "P" identified by reference numeral 86. In this example, the letter "A" identified by reference numeral 80 indicates a highest priority. Lower priority items are assigned subsequent letters. Then, letter "P", identified by reference numeral 86, is used to indicate a personal item. Although not shown, it is to be understood that depending upon the level of granularity required by a user, the present invention system could be extended by the use of numbers, i.e., "A1", "A2", etc., or by the use of some other prioritizing scheme. Also in this embodiment, meetings or pre-existing calendar items are to be given the first priority, i.e., to-do list items do not displace or effect previously scheduled event list items.

In addition to the assigning of priorities, a user may be requested (when a to-do list entry is created) to provide an estimate for the duration of a task. That information would be utilized in scheduling the items on the calendar. If no estimate were possible, a user defined default time would be utilized. As shown in FIG. 4, the to-do list item, "Write summary report" 88, is designated as requiring 60 minutes. The user has assigned time values as shown in FIG. 4 to the remaining to-do list items.

Figure 5:
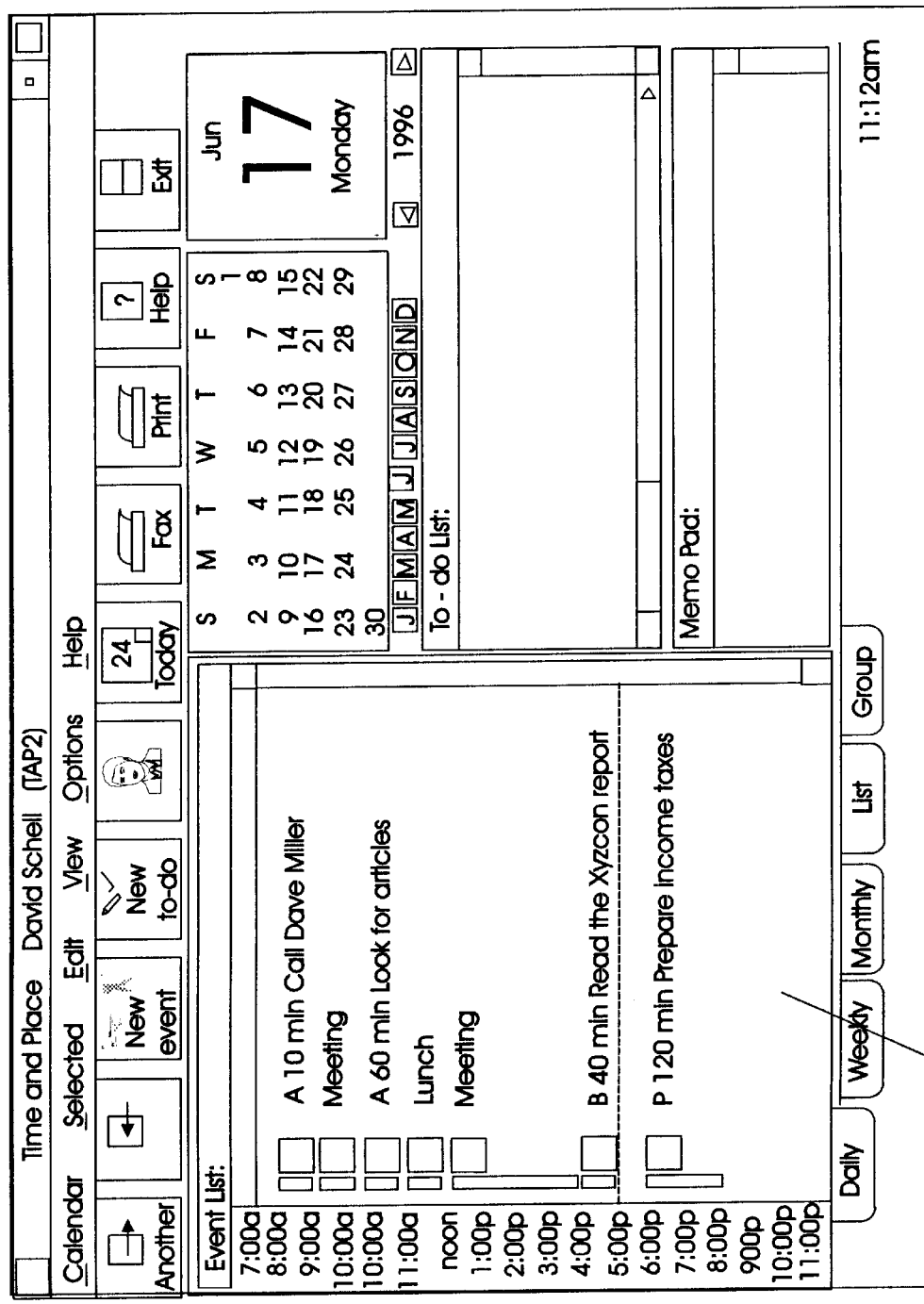
FIGS. 5 and 6 are graphical displays of the use of the present invention to convert the prior art calendar of FIGS. 2 and 3.
Figure 6:
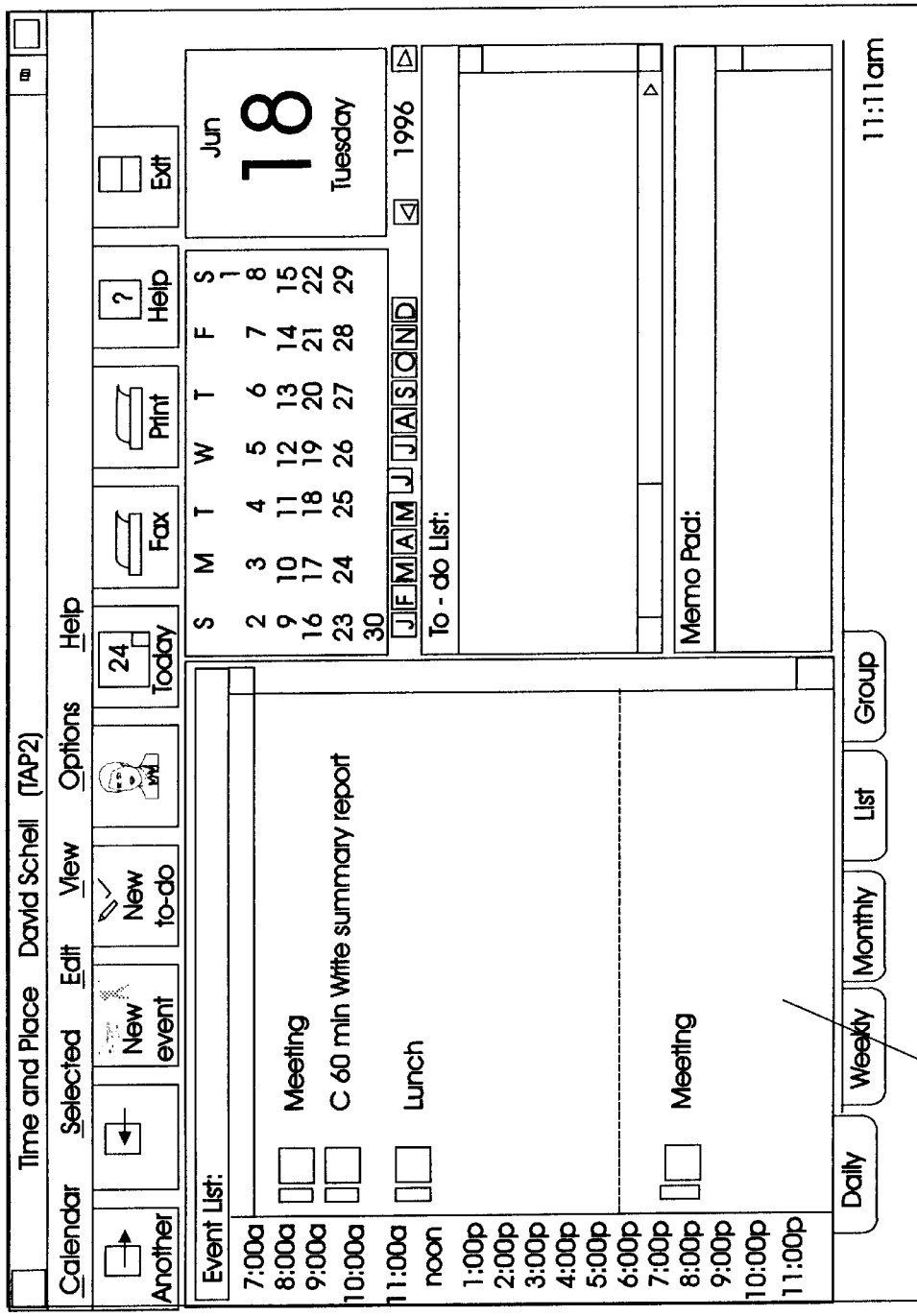

Referring to FIGS. 5 and 6, after having assigned priorities and time estimates to each event in the to-do list, the present invention, at user request, schedules each to-do list item onto the event list 50. Thus, as can be seen by comparing FIGS. 5 and 6 with FIGS. 2 and 3, all the to-do list items have been integrated into the scheduling calendar event list 50. For example, the "Write summary report" 88, has been placed on the event list 50 at 9:00 a.m. to 10:00 a.m. in FIG. 6. The present invention will position to-do list items on the event list based upon highest priority into the first available time slot that meets the assigned or default time value, followed by the next highest priority item and etc.

With the present invention, a user is able to more fully utilize the power of a scheduling calendar. The present invention integrates to-do list items into an event list in order to schedule a time for completion thereof rather than allow them to merely remain on a to-do list until removed by user action.

Although the present invention has been described with respect to specific preferred embodiment thereof, various changes and modifications may be suggested to one skilled in the art and it is intended that the present invention encompass such changes and modifications as fall within the scope of the appended claims.

We claim:

1. A method of integrating to-do items into an event list on an electronic calendering program, comprising the steps of:

assigning a user defined priority to a to-do list item;

assigning an amount of time needed to complete said to-do list item; and automatically integrating said to-do list item onto the event list, wherein said to-do list item is merged with the event list of the calendaring program for completion of said to-do list item.

2. The method of claim 1, wherein said step of automatically integrating comprises:

automatically integrating said to-do list item into the event list based upon said user defined priority and said amount of time needed to complete.

3. The method of claim 1, wherein said step of assigning a user defined priority comprises:

assigning an alphabetic priority indicator to said to-do list item.

4. The method of claim 1, wherein said step of assigning an amount of time comprises:

a user designating an estimated amount of time.

5. The method of claim 4, wherein said step of assigning an amount of time comprises:

automatically designating a default amount of time if no user designation occurs.

6. A system for integrating to-do items into an event list on an electronic calendaring program, comprising:

means for assigning a user defined priority to a to-do list item;

means for assigning an amount of time needed to complete said to-do list item; and means for automatically integrating said to-do list item onto the event list, wherein said to-do list item is merged with the event list of the calendaring program for completion of said to-do list item.

7. The system of claim 6, wherein said means for automatically integrating comprises:

means for automatically integrating said to-do list item into the event list based upon said user defined priority and said amount of time needed to complete.

8. The system of claim 6, wherein said means for assigning a user defined priority comprises:

means for assigning an alphabetic priority indicator to said to-do list item.

9. The system of claim 6, wherein said means for assigning an amount of time comprises:

means for a user designating an estimated amount of time.

10. The system of claim 9, wherein said means for assigning an amount of time comprises:

means for automatically designating a default amount of time if no user designation occurs.

11. A computer program product recorded on computer readable medium for integrating to-do list items into an event list on an electronic calendaring application, said program product comprising:

computer readable means for assigning a user defined priority to a to-do list item;

computer readable means for assigning an amount of time needed to complete said to-do list item; and computer readable means for automatically integrating said to-do list item onto the event list, wherein said to-do list item is merged with the event list of the calendaring program for completion of said to-do list item.

12. The computer program product of claim 11 wherein said computer readable means for automatically integrating comprises:

computer readable means for automatically integrating said to-do list item into the event list based upon said user defined priority and said amount of time needed to complete.

13. The computer program product of claim 11, wherein said computer readable means for assigning a user defined priority comprises:

computer readable means for assigning an alphabetic priority indicator to said to-do list item.

14. The computer program product of claim 11, wherein said computer readable means for assigning an amount of time comprises:

computer readable means for a user designating an estimated amount of time.

15. The computer program product of claim 14, wherein said computer readable means for assigning an amount of time comprises:

computer readable means for automatically designating a default amount of time if no user designation occurs.

* * * * *

Disclaimer 5,899,979 — David Robert Miller, Keller, Texas; David John Schell, Raleigh, N.C. METHOD AND SYSTEM FOR AUTOMATICALLY INTEGRATING SCHEDULED WORK ITEMS ONTO AN ELECTRONIC CALENDAR. Patent dated May 4, 1999. Disclaimer filed Oct. 4, 2006, by the assignee, International Business Machines Corporation.

Hereby enters this disclaimer to all claims of said patent.

*(Official Gazette February 27, 2007)*